United States Patent [19]

Guineau, III

[11] Patent Number: 5,426,736
[45] Date of Patent: Jun. 20, 1995

[54] METHOD AND APPARATUS FOR PROCESSING INPUT/OUTPUT COMMANDS IN A STORAGE SYSTEM HAVING A COMMAND QUEUE

[75] Inventor: William J. Guineau, III, Nashua, N.H.

[73] Assignee: Digital Equipment Corporation, Maynard, Mass.

[21] Appl. No.: 67,368

[22] Filed: May 26, 1993

[51] Int. Cl.[6] ............................................. G06F 13/00
[52] U.S. Cl. ..................................... 395/250; 395/275
[58] Field of Search ................ 395/250, 275, 375, 800

[56] References Cited

U.S. PATENT DOCUMENTS

| | | | |
|---|---|---|---|
| 4,349,871 | 9/1982 | Lary | 395/800 |
| 4,378,588 | 3/1983 | Katzman et al. | 395/275 |
| 4,392,200 | 7/1983 | Arulpragasam et al. | 395/425 |
| 4,449,182 | 5/1984 | Rubinson et al. | 395/250 |
| 4,603,382 | 7/1986 | Cole et al. | 395/250 |
| 4,860,193 | 8/1989 | Bentley et al. | 395/250 |
| 5,046,039 | 9/1991 | Ugajin et al. | 395/250 |
| 5,179,662 | 1/1993 | Corrigan et al. | 395/250 |
| 5,210,829 | 5/1993 | Bitner | 395/250 |
| 5,247,626 | 9/1993 | Fikoozmand | 395/250 |
| 5,257,370 | 10/1993 | Letwin | 395/650 |
| 5,276,677 | 1/1994 | Ramamurthy et al. | 370/60 |
| 5,276,840 | 1/1994 | Yu | 395/425 |

FOREIGN PATENT DOCUMENTS

| | | |
|---|---|---|
| 59-006259 | 4/1984 | Japan . |
| 2-253457 | 1/1991 | Japan . |
| 4-312133 | 3/1993 | Japan . |

OTHER PUBLICATIONS

"A Simple Theory of Traffic and Resource Allocation in ATM" Low et al, IEEE, 1991, pp. 1633-1637.
"Congestion Control and Switch Buffer Allocation in High-Speed Networks", Hae, IEEE, 1991, pp. 0314-0322.
"On Buffer Dimensioning and Static Rate Control in Broad Band ATM Networks", Wong, IEEE, 1991, pp. 0280-0286.

*Primary Examiner*—Parshotam S. Lall
*Assistant Examiner*—Viet Vu
*Attorney, Agent, or Firm*—Dirk Brinkman; Ronald C. Hudgens; Arthur W. Fisher

[57] ABSTRACT

An apparatus and method for dynamically tuning queue depths to provide improved storage subsystem throughput and resource utilization across a full range of I/O loads is described. The maximum allowable queue depth for a command queue is adjusted at predetermined cycle intervals on the basis of an I/O workload measured during the cycle. In one embodiment of the invention, the interval is a fixed system parameter, but in an alternative embodiment, the interval size is automatically adjusted to keep the rate of adjustment of the maximum allowable queue depth within a preferred range. In a preferred embodiment, the size of each I/O command is stored before it is sent to the device queue. Read, write and miscellaneous I/O commands may be queued and managed separately. After a predetermined number of commands have been stored, the predominant command size during the cycle interval is determined. The predominant command size is used to select a new maximum allowable queue depth, from a set of established values preferably selected so that, at least to a first order approximation, the maximum allowable queue depth is inversely proportional to the predominant command size. Preferably, this value is selected from a set of values which have been predetermined for all possible command sizes allowed for the system.

5 Claims, 12 Drawing Sheets

_METHOD AND APPARATUS FOR PROCESSING INPUT/OUTPUT COMMANDS IN A STORAGE SYSTEM HAVING A COMMAND QUEUE_

FIELD OF THE INVENTION

The present invention relates generally to systems and methods for optimizing throughput in mass storage subsystems. More particularly, the present invention relates to a system and method for dynamically tuning the command queue depth in a mass storage subsystem.

BACKGROUND OF THE INVENTION

Command queueing is increasingly relied upon to provide improved resource utilization in conventional mass storage subsystems. In a mass storage subsystem using command queueing, I/O commands are accumulated in a buffer in the device controller which performs various known optimizations on the queued commands in order to improve the data throughput when the commands are executed by the device. For example, the commands in the queue may be reordered so that commands are executed in a sequence determined by the physical location of the data requested rather than the order in which the commands were received by the device controller. Since device access times for all but the largest data requests are determined by the time it takes to move to the block of data on the device rather than by the time it takes to actually copy the data once it has been located, ordering commands to minimize device movement can significantly reduce average access times.

Command queueing may be implemented for single disk subsystems, but it is particularly advantageous for arrays of disk which use complex distributed addressing schemes. In RAID systems, in which redundant arrays of independent/inexpensive disks are configured to appear as a single virtual disk to the user, and which are typically used in heavy I/O load environments, command queueing provides significant improvements in system performance.

Despite its inherent advantages, there are problems associated with conventional command queueing systems. Each portion of the storage subsystem operates at its own rate, but is dependent on inputs and outputs from the other parts. If either the searching capacity of a device or the carrying capacity of a bus is exceeded, some portion of the storage subsystem will be forced to remain idle until the bottleneck in the other part clears. This situation, known as saturation, is a major cause of poor I/O subsystem performance. Moreover, different portions of the subsystem respond differently to commands which request different amounts of data. When the requested data size is small, the device latency, the time it takes the device to move to the designated address, is usually the most significant factor in subsystem response time. However, when the data size is very large, the time to copy and transmit the data will far exceed the device latency, and the bandwidth of the bus rather than the device access time will become the limiting factor on subsystem performance. In a multi-spindle system, where many devices share a bus, competition among devices for bus access can cause saturation. Command queueing significantly increases the likelihood of saturating the bus when handling large I/O requests, particularly in systems where many devices share a bus.

In most conventional command queueing systems, the maximum permitted depth of the device command queue is a static system parameter. Some prior art command queueing systems have been designed so that command queue depths are effectively unlimited. In these systems, the depth of the command queue is established by a physical limit such as the size of the buffer, and this is set at a level so much greater than any queue depth which is expected to occur under actual operating circumstances that system is never expected to reach it. For example, the SCSI-2 tagged command queuing scheme described in American National Standard for Information Systems—Small Computer System Interface draft specification X3.131-19xx permits up to 256 outstanding I/O commands in the queue.

Other prior art command queueing systems have placed a relatively low limit on the potential depth of the device command queue and implemented flow control procedures to insure against overflow of commands in excess of what the queue could handle at one time. For example, some implementations of Digital Equipment Corporation's Mass Storage Control Protocol (MSCP) set a static default queue limit of 8 credits. A credit is a measure determined by the number of internal operations which a given command requires. In one implementation, however, the static limit was the sum of all the allowed credits for all the queues in a multidisk system, and these credits could be reallocated dynamically among the disks within that limit. A queue would be automatically granted more credits, within the overall limit, if the host was unable to send a command to that queue because its credit limit had been exceeded.

All known conventional command queueing systems entirely ignore the effect of I/O request size on subsystem performance. In other words, no currently available command queueing system adequately addresses the impact of saturation on optimal resource allocation for both large and small I/O request sizes.

However, most storage subsystems must handle a wide range of I/O sizes, ranging from a few bytes to hundreds of blocks. It is difficult to establish a static queue depth which will be efficient across the full range of possible I/O requests. If a relatively low queue depth is chosen, the subsystem's ability to use queue optimization techniques to minimize device access times will be severely limited. If a relatively high or unlimited queue depth is chosen, the system will be able to achieve significant reductions in device latencies when handling multiple small I/O requests, but may exceed its bus load capacity when handling large I/O requests. The potential bus load problem is even worse if the queue depth is adjustable solely in response to host demand, since this may favor additional loading of queues which have already been saturated by a few large data requests.

Accordingly, an improved system and method for managing command queueing to minimize device latencies when handling small I/O requests while avoiding bus saturation when handling large I/O requests is desirable.

SUMMARY OF THE INVENTION

The present invention is a system and method for dynamically tuning queue depths to provide improved storage subsystem throughput and resource utilization across a full range of I/O loads, from small to large queue depths and small to large I/O sizes. The maximum allowable device queue depths are adjusted at predetermined intervals on the basis of the workload measured during the interval. In one embodiment of the invention, the selected interval is a fixed system parameter, but in an alternative embodiment, the interval size is automatically adjusted to keep the rate of adjustment of the maximum queue depth within a preferred range.

In a preferred embodiment, the history of the sizes of each I/O command sent to the device queue is recorded. After a predetermined number of commands have been recorded, the predominant command size during the interval is determined. The predominant command size is used to select a new maximum allowable queue depth, from a set of established values preferably selected so that, at least to a first order approximation, the maximum allowable queue depth is inversely proportional to the predominant command size. These values may be determined heuristically, or calculated from the values of known system parameters, as further described below. The maximum allowable device queue depth is set at this new value for the duration of the next interval, during which the process is repeated. Thus, the maximum allowable device queue depth is regularly updated to reflect actual device workloads.

BRIEF DESCRIPTION OF THE DRAWINGS

Other advantages of the invention will become apparent upon reading the following detailed description and upon reference to the accompanying drawings, in which.

Figure 1:
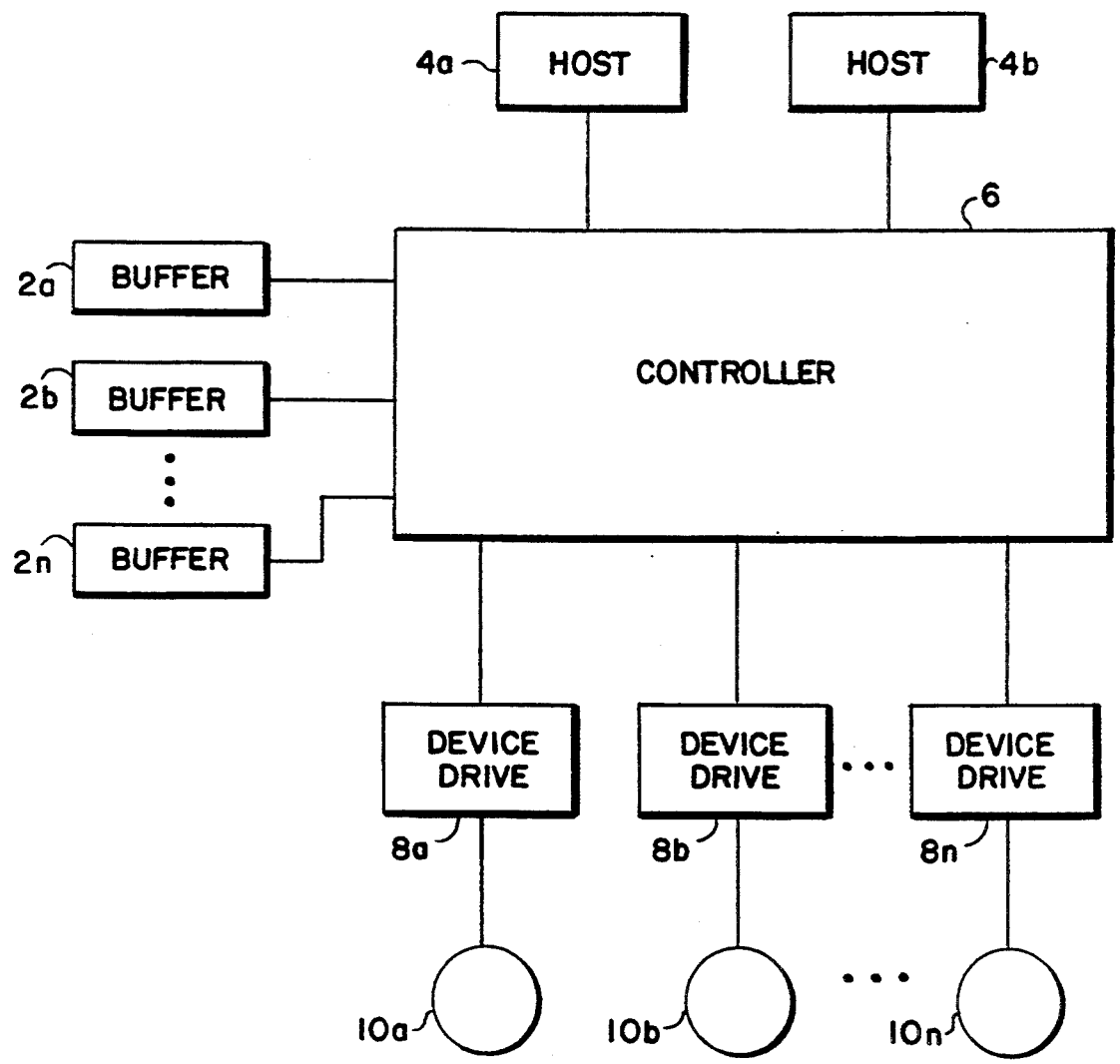
FIG. 1 and FIG. 2 are block diagrams representing computer systems embodying the present invention.

While the invention is susceptible to various modifications and alternative forms, specific embodiments thereof have been shown by way of example in the drawings and will herein be described in detail. It should be understood, however, that the invention is not intended to be limited to the particular forms disclosed. On the contrary, the applicant's intention is to cover all modifications, equivalents, and alternatives falling within the spirit and scope of the invention as defined by the appended claims.

DETAILED DESCRIPTION OF THE PREFERRED EMBODIMENTS

The present invention is a method and apparatus for dynamically tuning queue depths to provide improved storage subsystem throughput and resource utilization across a full range of I/O loads, from small to large queue depths and small to large I/O sizes. Various systems for queueing storage commands in order to reduce access latencies are known to those of ordinary skill in the field.

The invention maintains throughput at near-optimal levels despite significant fluctuations in I/O load size. This aspect of the invention is particularly useful in systems that experience varying numbers and sizes of I/O requests over time. Image processing systems, file servers, and large transaction processing systems are among the types of systems whose workloads my fluctuate in this manner. Much improved response times and more consistent overall throughput can be obtained in such systems by implementing the present invention.

Referring to the drawings, FIG. 1 is a block diagram showing one embodiment of an I/O system organized according to the present invention. FIG. 1 shows a configuration typical of redundant arrays of independent/inexpensive disks (RAID assemblies) in which the invention may advantageously be implemented. Host computers 4a and 4b are connected to an intelligent controller 6, which controls the operation of a plurality of device drives 8a through 8n and corresponding devices 10a through 10n that are configured as a storage array. As will be appreciated by those skilled in the art, the number of devices and drives in such an array is variable. In the preferred embodiment of the invention, the array is a standard disk array, but other mass storage arrays, such as tapes and CDROMs, are also suited to the present invention.

The invention may be implemented in any I/O system which provides for queueing of I/O commands by the controller, host, or both. For example, any intelligent controller which implements the tagged command queueing option described in the American National Standard for Information Systems—Small Computer System Interface-2 (SCSI-2) specification (X3.131-19XX) or the command queueing option described in the Digital Equipment Corporation Mass Storage Control Protocol may be used to implement the invention. Controllers which conform to these architectures are well-known in the field and accordingly, further description is not necessary. Such a controller may be implemented in hardware and/or software. Accordingly, the present invention can be implemented in either hardware or software.

Figure 2:
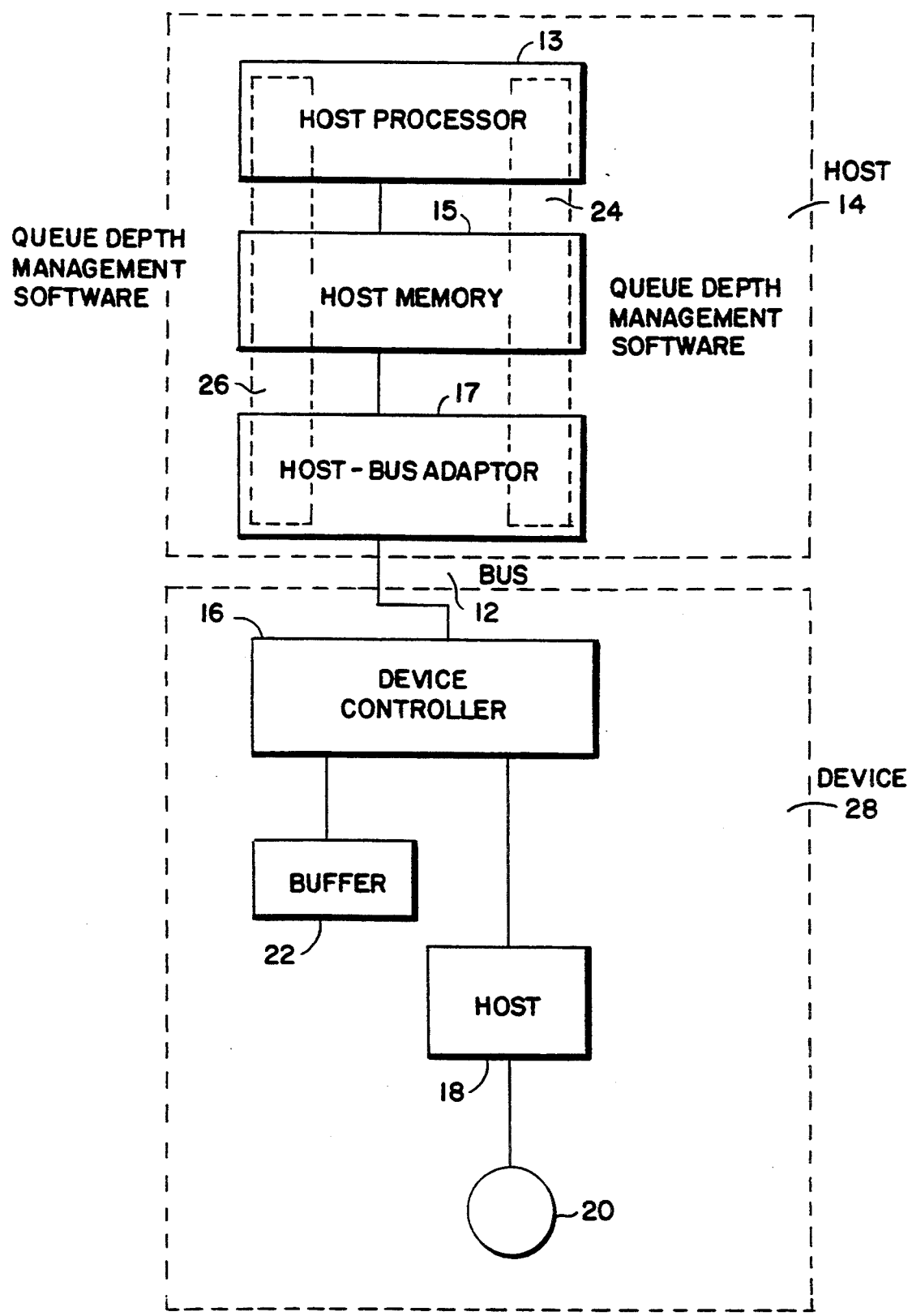

In software implementations of the invention, the software may reside in the memory of the host computer, or in any portion of the device, such as the controller or even the drive itself, which incorporates memory. It is possible to implement the invention in software wherever the system includes memory and a processor. The preferred embodiment of the present invention is a software implementation in which both the queue depth adjustment software and the queue depth management software reside in the host computer as shown in the more detailed block diagram of FIG. 2. In FIG. 2, host computer 14 is configured with queue depth adjustment software 24 and queue depth management software, 26, according to the present invention. The host 14 is connected through a bus 12 to an I/O device assembly 28. The controller functions are shared between a host-bus adapter 17 resident in the host 14 and a device controller 16 resident in the device assembly 28. The host 14 also includes a host processor, 13 and a memory, 15, which may be accessed by both the host processor 13 and the adapter 17. For convenience, only a single host computer and device assembly is shown in FIG. 2, but it will be appreciated that arrays of hosts or mass storage devices, such as those shown in FIG. 1, might also be used.

As will be further discussed below, the queue depth management software of the present invention stores at least some of the I/O commands directed to each device or multi-spindle array in a queue. In the embodiment shown in FIG. 1, the queue is configured as a plurality of separate buffers 2a through 2n, corresponding to drives 8a through 8n, respectively. The buffers are preferably maintained in a volatile memory in the controller 6. Each of the buffers 2a through 2n preferably contains the queue for one of the devices in the array. The structure and operation of such buffers are well known in the field.

In an alternative embodiment, such as that shown in FIG. 2, the buffers may be maintained on one or more of the devices of the storage array itself. Thus, in FIG. 2, buffer 22 is maintained on device 20. The controller is associated with a buffer, 22 and a device, again preferably disk, drive, 18. Each drive is associated with a device, 20. The queue depth management software, 26, stores a variable maximum allowed queue depth in the host memory, 15 which is used by the adapter 17 and host processor 13, in accordance with the invention, to perform operations which dynamically limit the length of the command queue.

As will also be discussed below, the queue depth adjustment software, 24, of the present invention stores the size of each data command and certain predetermined system parameters in memory registers and periodically performs operations based upon this data. In the embodiment shown in FIG. 1, these registers are preferably maintained on the intelligent controller, 6, which also performs the required operations, while in FIG. 2, these registers are preferably maintained in [] memory 15 in the host computer, 14, which performs the required operations.

Figure 3:
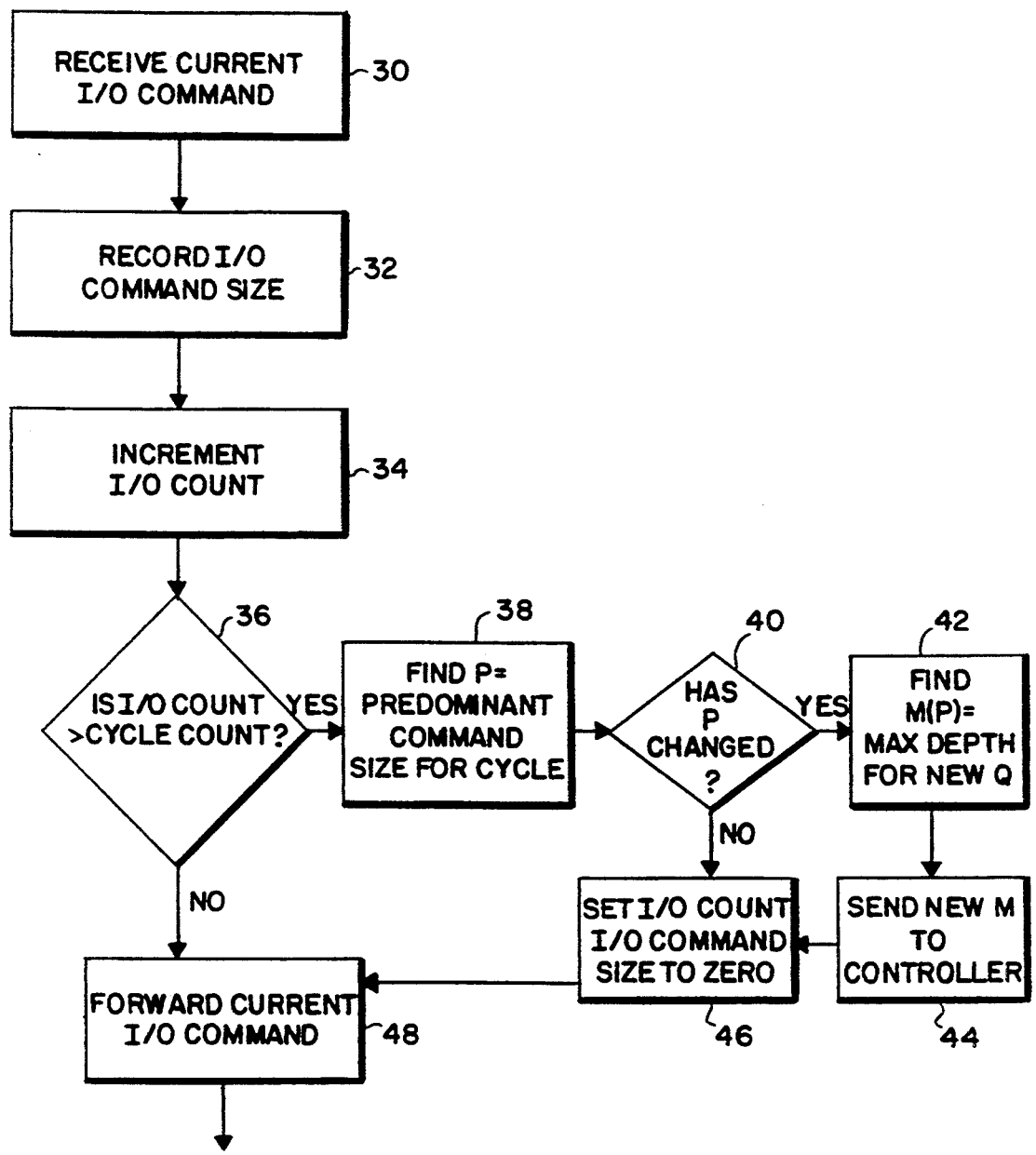
FIG. 3 is a flow chart showing the maximum queue depth adjustment process in accordance with a preferred embodiment of the present invention.

FIG. 3 is a flow chart showing an overview of the queue depth adjustment cycle in accordance with a preferred embodiment of the present invention. An I/O command is received by the queue depth adjustment software at step 30. A typical I/O command is generated by an application program or operating system running on one of the host computers (4a or 4b in FIG 1 or 14 in FIG. 2). The request is received by the queue depth adjustment software, 24 or the equivalent hardware. As indicated earlier, the software may be resident on the host or on an intelligent controller. Typical I/O commands specify an initial address and a size for each data request. At step 32, the software records the size of the I/O command. In the preferred embodiment, the size of each I/O command received during a given cycle interval is recorded in an array of predetermined length, preferably as a histogram. The histogram intervals, or "buckets", represent the range of I/O sizes possible for the system. Bucket sizes of from 3–7 blocks are preferred for the disk management systems of the present invention, but any size bucket may be used. In the preferred embodiment, the predominant I/O command size, P, is taken to be the histogram bucket which collects the greatest number of entries during a given cycle. If two buckets have the same number of entries a tie-breaker rule is implemented. A preferred rule is that if two or more buckets contain the same largest number of entries, the bucket representing the largest I/O size in the tying set is chosen.

The array is used to update the maximum allowed queue depth at predetermined cycle intervals. The maximum expected command size is used to set the length of the array. Cycle intervals based on the count of commands sent to the system are preferred, but other types of intervals, such as fixed time intervals, could be implemented using well-known methods without departing from the spirit of the invention. In the preferred embodiment, the cycle interval is determined by Cycle Count, a preset number of I/O commands received by the adjustment software. The number of entries in the array I/O Command Size, will equal the value of Cycle Count. Thus, at step 32, the size of the current I/O command is stored in the appropriate place in the I/O Command Size array, and at step 34, I/O Count, the actual count of I/O commands received during the current cycle, is incremented. At step 36, I/O Count is tested to see if it exceeds the predetermined Cycle Count. In one embodiment of the current invention, read counts and write counts are queued and monitored separately, with each queue depth adjustment process following the steps outlined in connection with FIG. 3 or alternatively, FIG. 10, and each queue depth management process following the steps outlined in FIG. 11. If the cycle count has not been exceeded, the adjustment software forwards the current I/O command at step 48, and takes no further action until the process is restarted by the receipt of the next current I/O command at step 30.

However, if I/O Count does exceed Cycle Count, then at step 38, P, the predominant I/O command size for the cycle, is determined using the data stored in the histogram. As the examples given below indicate, various methods may be used to determine the predominant command size, but a preferred method, because it involves very little system overhead, is to simply select the histogram bucket which received the greatest number of entries during the preceding cycle. In the preferred embodiment, P is tested at step 40 to see if it has changed from the P selected during the previous cycle interval. While it is within the scope of the invention to perform a queue depth adjustment at the end of every cycle, whether or not P has changed, it reduces system overhead to perform the adjustment only for the cycles in which P has changed. Therefore, if P has not changed, the I/O count cycle is restarted by setting I/O Count and the command size array to zero. But if P has changed, a new maximum allowable device queue depth, M(P), is selected at step 42 based on the new P value and the established system parameters. In accordance with the invention, the value of M(P) will be in inverse relation to the value of P.

Figure 8:
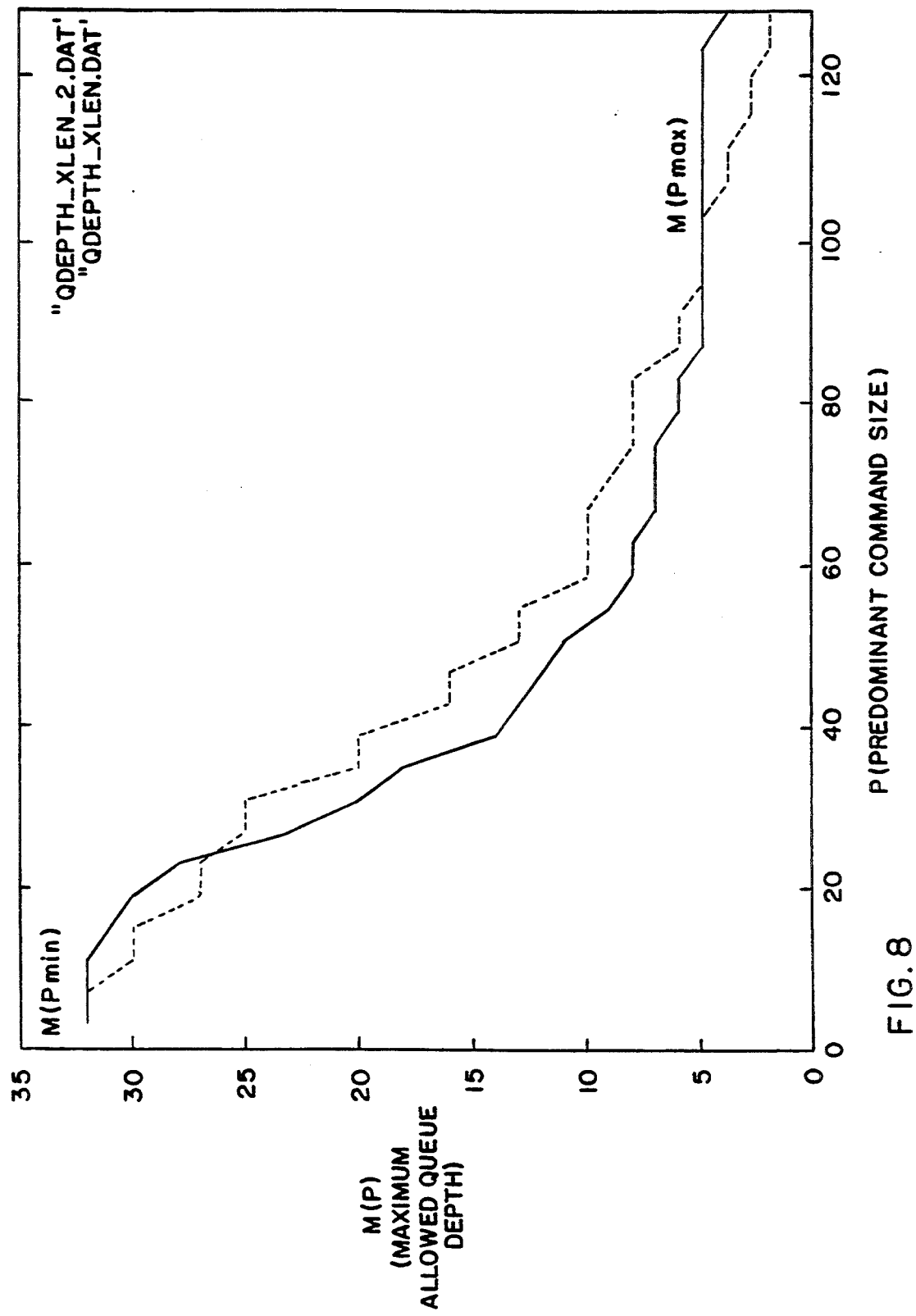
FIG. 8 is a chart of preferred queue depths developed for the example system in accordance with one embodiment of the current invention.
Figure 10:
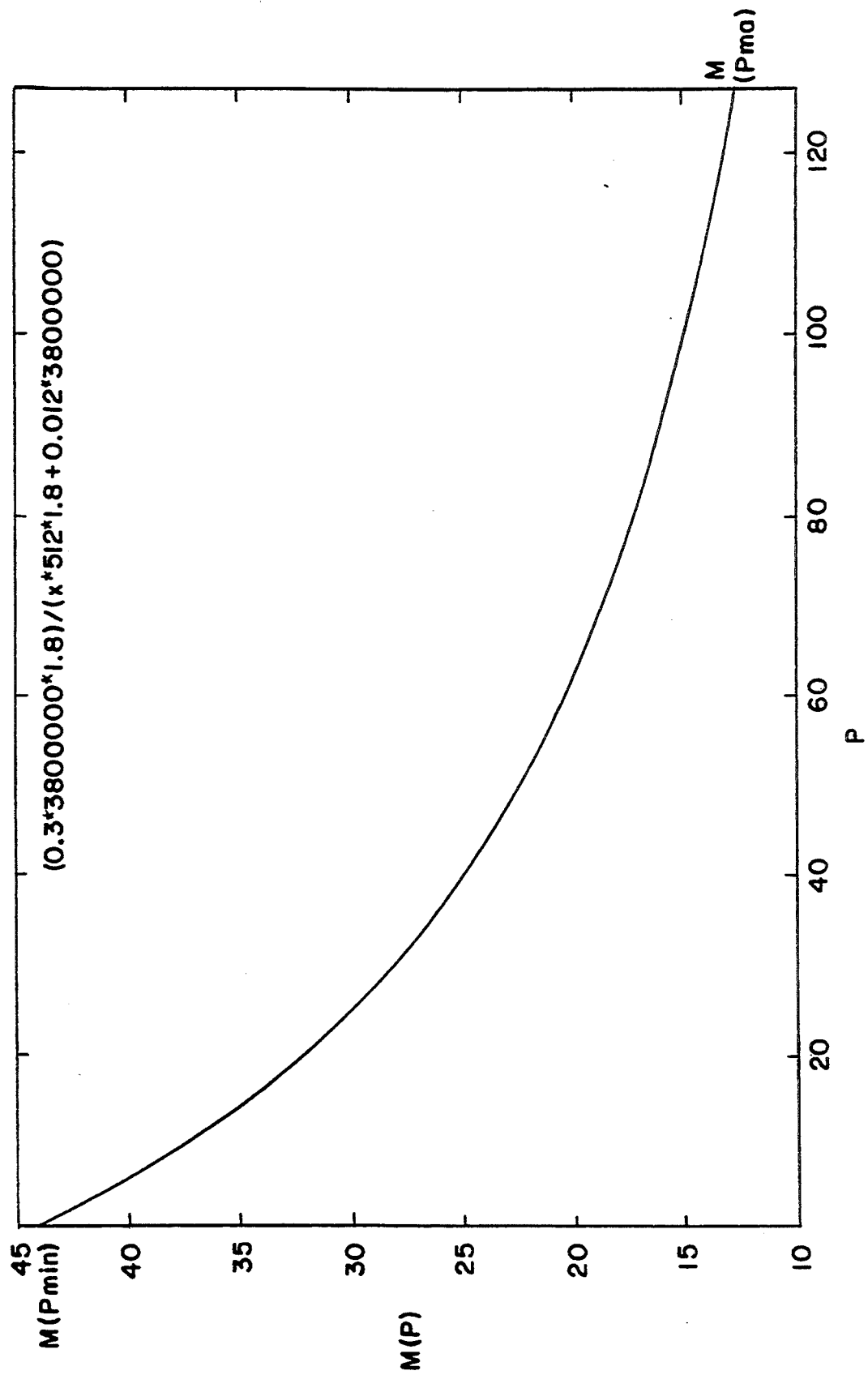
FIG. 10 is a chart of preferred queue depths developed for the sample system in accordance with an alternative embodiment of the current invention.

Typical M(P) values for an example system are shown in FIGS. 8 and 10. The preferred methods for determining M(P) values for a given system are discussed in the examples below. It is preferred that the values for M(P) be stored in a table so that they may be accessed as necessary with minimum system overhead, but they may be calculated. In step 44, the adjustment software sends the new M value to the queue depth management software of the present invention, which is preferably located in the controller. It then restarts the queue depth adjustment cycle in step 46 by setting I/O Count and the array I/O Command Size to zero. Finally, at step 48, the current I/O command is forwarded, and the software takes no further action until the cycle is restarted by the receipt of the next current I/O command at step 30.

Examples of preferred methods for determining M(P) values for a particular system are given below. The example system includes a VAX/VMS host and a five spindle RAID array of SCSI-2 disk drives.

Command sizes for the system may range from 1 to 127 blocks. Each queue may have a depth of up to 256 commands, but queue depths over 50 commands are not expected.

EXAMPLE 1

In a preferred method for determining the M(P) values suitable for use in a given system, a first step is to measure the number of I/O/sec, i, and the throughput, j, actually obtained in moving data to and from the host over the full range of queue depths, q, and allowed command sizes, n. This is preferably done by exercising the system and recording the resulting values. It is preferred that the average latencies for the system be accumulated at the same time by averaging the I/O values. Maximum latencies may be tracked in addition to, or instead of average latencies.

Exercising a system is a simple process well within the scope of those skilled in the art. Source code for program designed to exercise the example system and collect the required values is attached as Appendix 1. While the program was developed for a VAX/VMS system and incorporates the queue depth and command size limits appropriate to the example system, it may be adjusted to other I/O subsystem limitations or ported to another host system using conventional techniques.

Figure 4:
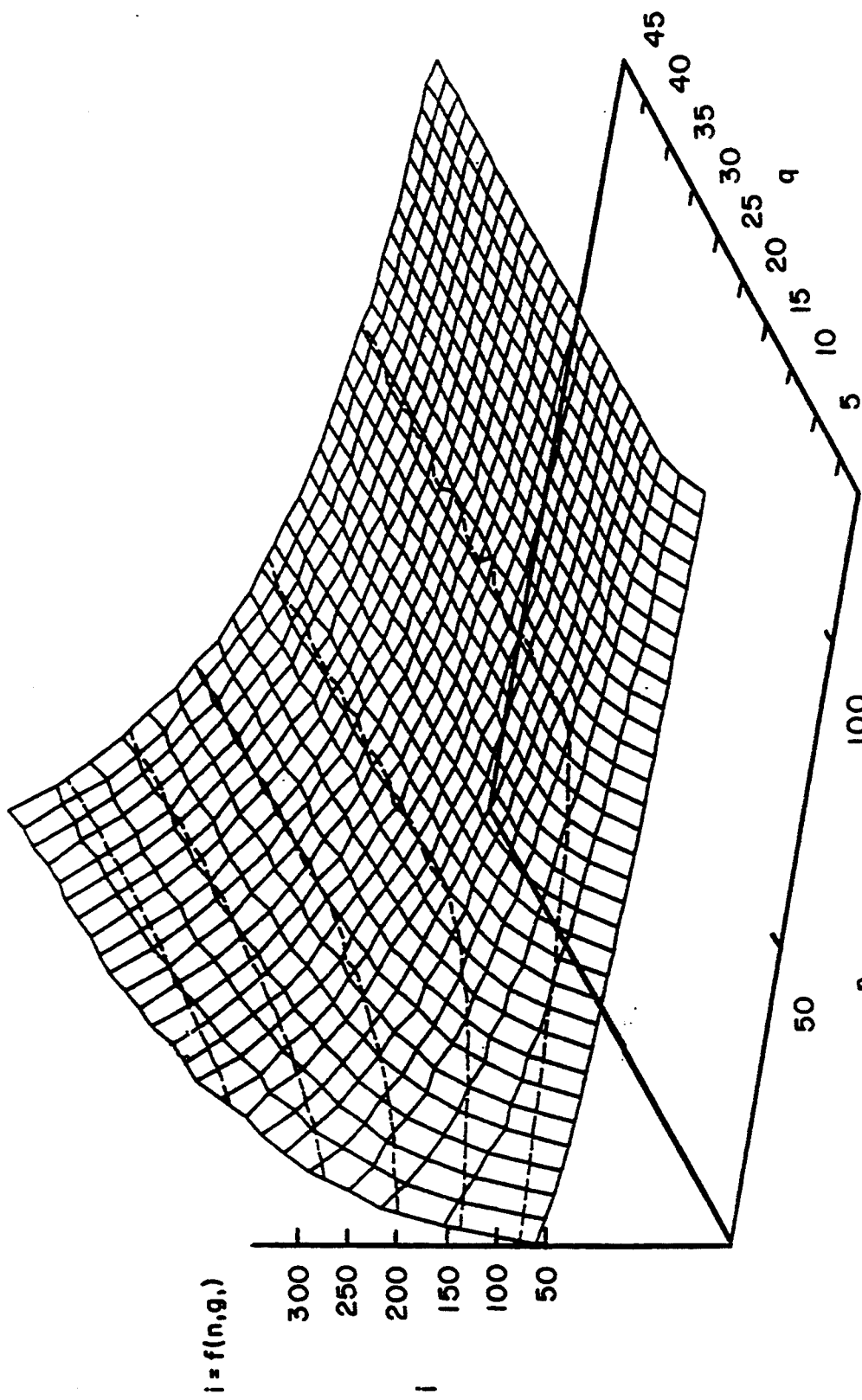
FIG. 4 is 3-dimensional graph of the relation between I/O time, allowed command sizes and queue depth which was measured for an example system.
Figure 5:
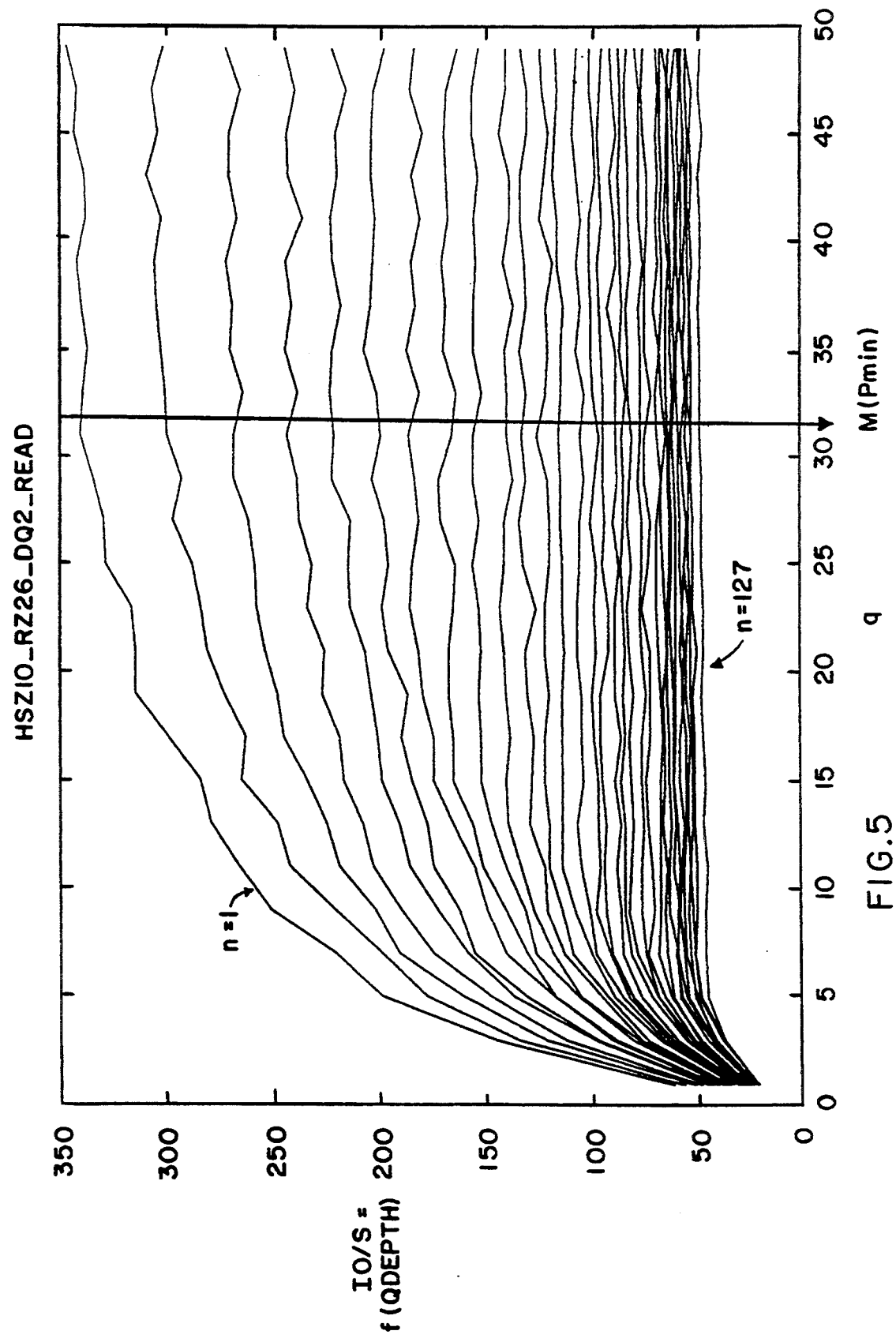
FIG. 5 is a contour projection of the graph of FIG. 4 for constant values of the command size.
Figure 6:
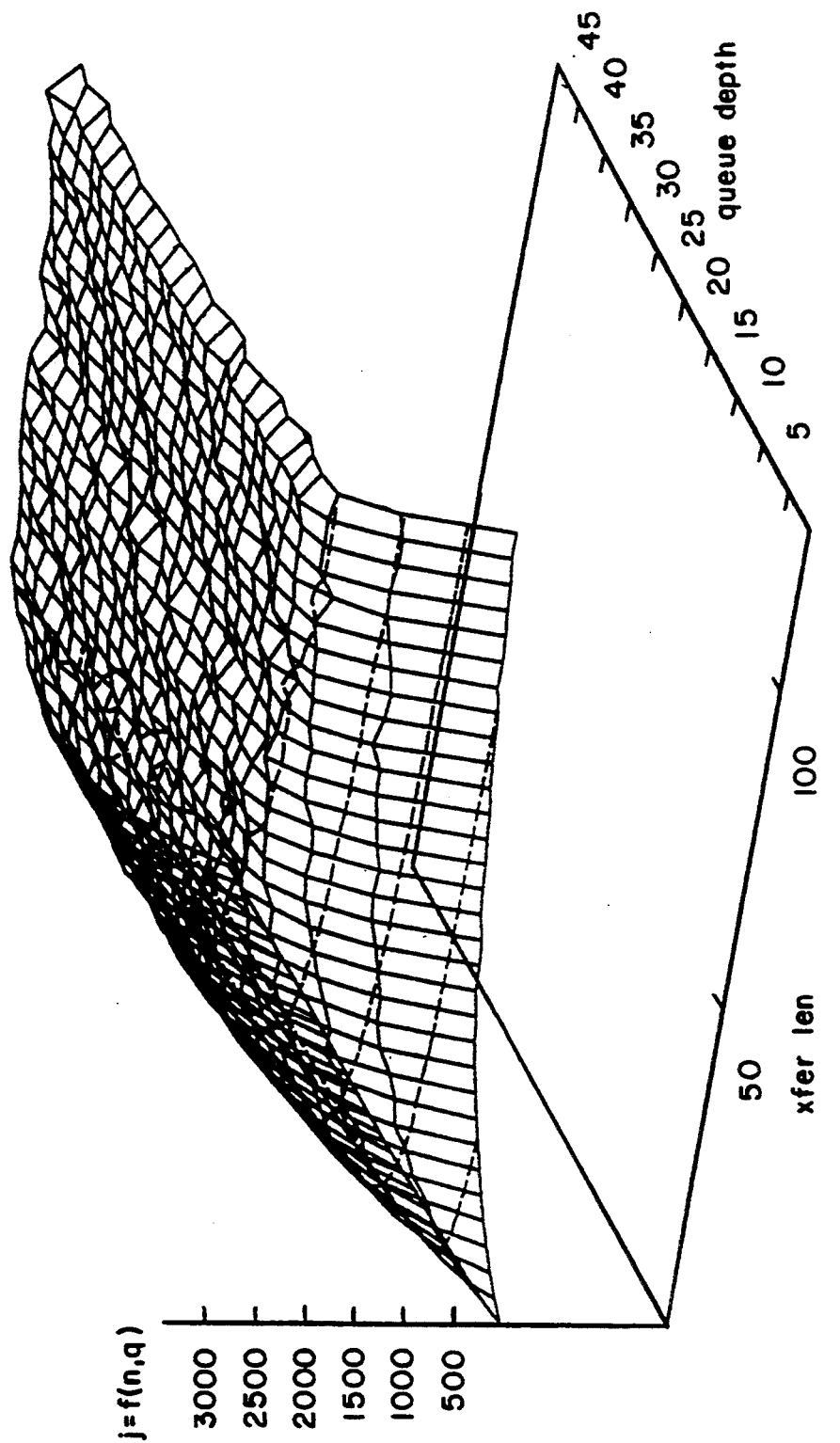
FIG. 6 is a 3-dimensional graph of the relation between throughput, allowed command sizes and queue depth which was measured for an example system.
Figure 7:
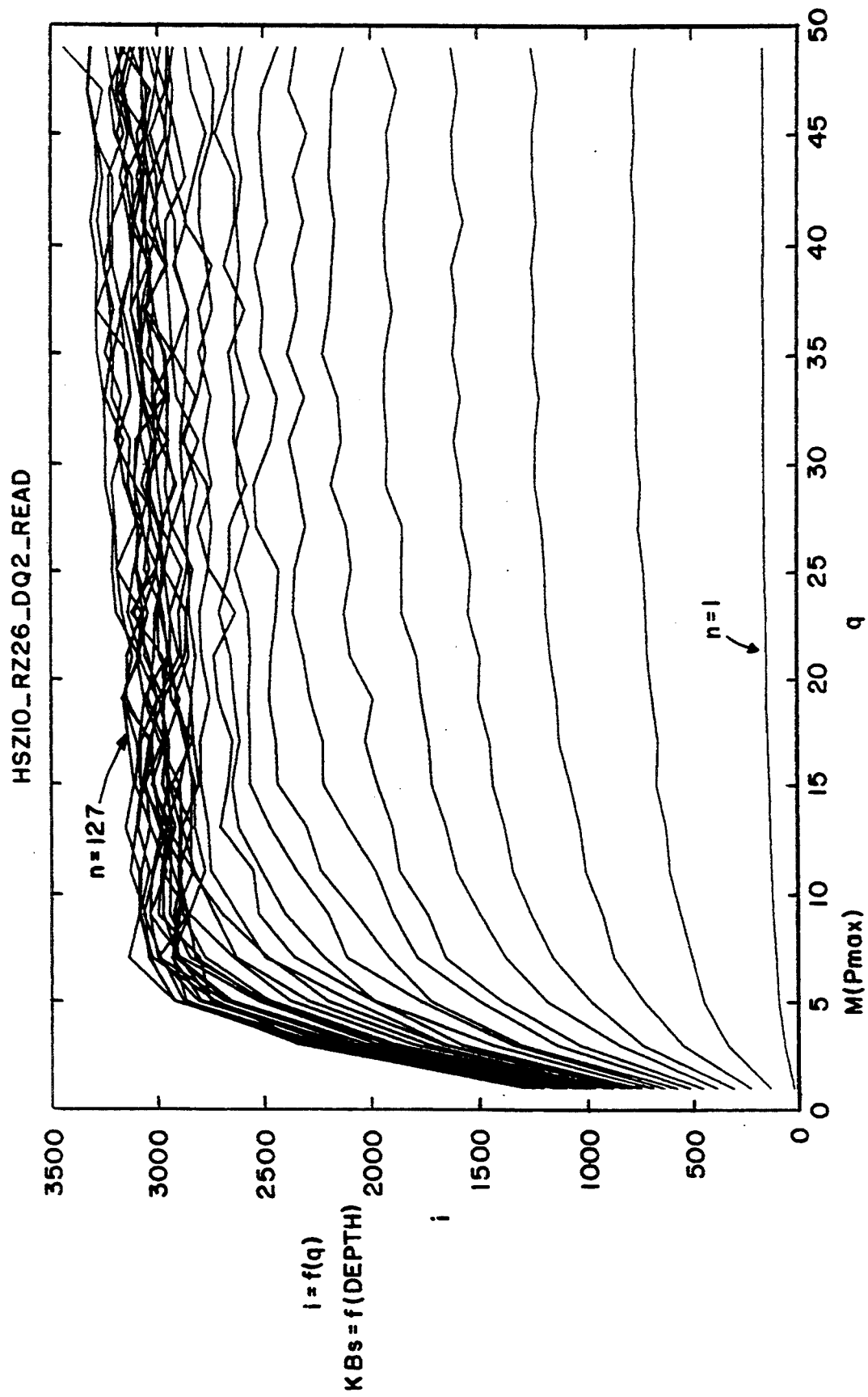
FIG. 7 is a contour projection of the graph of FIG. 6 for constant values of the command size.
Figure 9:
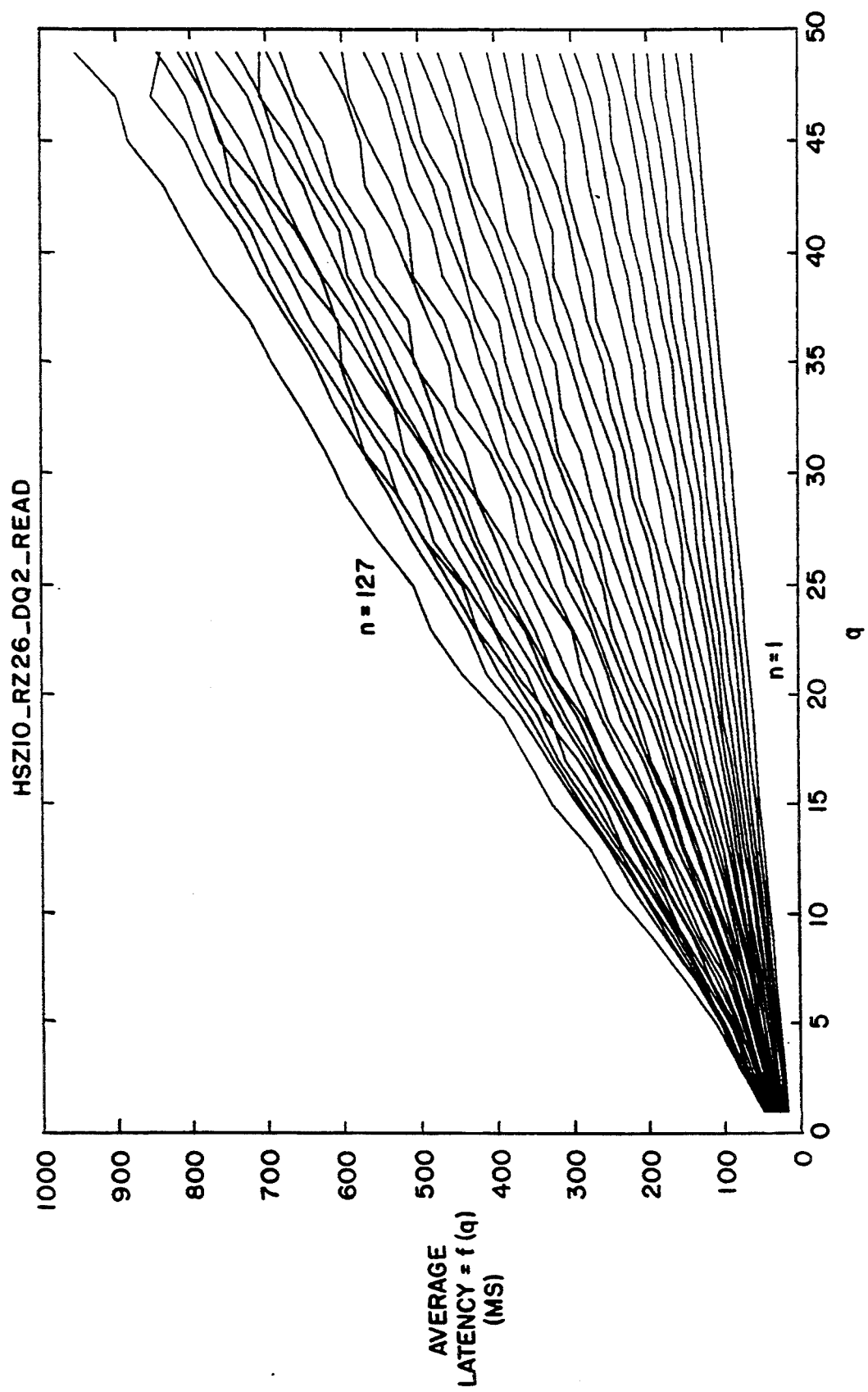
FIG. 9 is a graph of the average latency values for the example system of FIGS. 4-7.

Values of i and j were collected for the example system over a range of $1 < q < 50$ and $1 < n < 127$, and plotted in FIGS. 4 and 6 respectively, using GNUPLOT, a shareware program available through the Free Software Foundation. Other commercial plotting programs might also be used. FIG. 5 is a contour projection of the graph of FIG. 4 for constant values of the command size. FIG. 7 is a contour projection of the graph of FIG. 6 for constant values of the command size. Average latency values were also collected and plotted using the same program. FIG. 9 is a graph of the average latency values for the example system of FIGS. 4-7.

To obtain the M(P) values, the contour line for the lowest allowed command size, n=1, was located on FIG. 5, and the approximate point where increasing queue depth q no longer affects I/O time, i, was identified on this line. This point, where the slope of the line goes to zero, was selected as the P, M(P) coordinate for the smallest bucket Pmin.

Next, the contour line for the highest allowed command size, n=127, was located on FIG. 6, and the approximate point where increasing queue depth no longer provides increased throughput was identified on this line. This point, where the slope of the line goes to zero, was selected as the P, M(P) coordinate for the largest bucket, Pmax.

Since the range of allowed command sizes is from 1 to 127 blocks, a bucket size of 4 was chosen for the histogram to permit the histogram table and the M table to be 32 longwords apiece in size, a reasonable overhead for the example system. Next, the plotting software was used to generate a curve with the shape M(P)~1/P between these two endpoints. Values were read from this curve for a representative point in each bucket, and these values were connected stepwise to provide the M(P) values shown by the dotted line in FIG. 8. Values obtained in this manner may be used without further refinement to implement the invention. However, additional performance gains may be obtainable for some systems by testing the performance of the system using these values, and adjusting M(P) by trial and error in the direction of decreased average and maximum latencies. FIG. 9 is a contour projection of average latencies for constant values of n from which such tuning may be done. The M(P) values shown by the solid line in FIG. 8 are the result of tuning done in this manner for the example system.

EXAMPLE 2

Examination of the 3-dimensional graph in FIG. 4 suggests that an optimal queue depth, q, in accordance with the invention, for a given command size, n, is the depth which will minimize y, the total time required to move q blocks of data to or from the host, where $$\min y = \frac{n^{*}q}{R} + \frac{K^{*}q}{Z} + C \tag{1}$$

and

R is the realized bus throughput between the subsystem and the host, K is the average access time for the storage device, Z is the queueing efficiency factor, and C is a small constant determined by other system parameters such as cpu interrupt time, code paths, bus overhead, etc.

The bus throughput, R and device access time, K are values which are well known to those familiar with storage subsystems. R and K may be measured for a given system using known techniques, and are generally published in the specifications for commercial systems. For the example system, R has a value of 3.8 megabytes per second, and K has a value of 12 milliseconds.

Z is a measure of queueing efficiency which will vary between about 1 and 3 depending on the number of disk spindles included in the device array and the efficiency of the queueing optimization techniques used. Z may be measured, or estimated based on these two parameters. For example, a non-optimized, single spindle system which simply executes all I/O commands in the order received from the host would have a Z of 1.0, and optimized single spindle systems would have Z values under 1.5, while a complex RAID system such as that shown in FIG. 1, which uses known optimizing techniques such as elevator seek patterns or rotational latency arrival scheduling to reorder queues across multiple spindles would have a Z of 1.8 or more. The Z value of the example system, which includes a RAID array, is 1.8.

In accordance with known mathematical techniques, min y(n,q) may be obtained by setting the first derivative of the formula equal to zero. While such a partial differential equation may be difficult to solve manually, it may be solved graphically using commercially available software packages.

It is not necessary, however to solve the partial differential equation:

$$\min y = \frac{n*q}{R} + \frac{K*q}{Z} + C \qquad (1)$$

It will be seen that the first term in algorithm (1), n*q/R, which represents the transfer time required to move q blocks of data of size n, is primarily determined by the realized bus throughput, R. The second term, K*q/Z, accounts for the seek time, on average, required by the storage device to collect q blocks of data. C is a constant that bundles the remaining overhead such as cpu interrupt time, code paths, bus overhead, etc. In most modern systems, C is on the order of a few hundred microseconds, and may be ignored since it is a couple of orders of magnitude smaller than the times required to seek and transfer data. For the example system, C has a value of 200 microseconds, which is small in comparison to the other values.

Consequently, a first-order approximation for a worst allowable response time, y', can be obtained as $$q(n,y') = \frac{y' * RZ}{nZ + KR} \qquad (2)$$

Plugging in values for R, Z, and K, including a conversion factor of 512 bytes/block and taking a worst-case response time of y'=0.3 sec, this gives $$q(n) = \frac{.3 * 3800000 * 1.8}{(1.8 * 512 * n) + (3800000 * .012)} \qquad (3)$$

as a first approximation of the queue depth table. FIG. 10 shows a maximum queue depth M(P) v. P curve plotted in accordance with this formula for the example system on GNUPLOT.

As in example 1, values may be read from this curve for a representative point in each bucket, and, if desired, tuned in the direction of minimum average and maximum latencies.

In the examples discussed above, the cycle interval was established as a system parameter and held constant during the operation of the system in accordance with the invention. However, for systems in which the composition of the I/O load may change significantly over time, it may be desirable to minimize thrashing by providing a method of automatically adjusting this parameter. A flow chart for an alternative embodiment of the queue depth adjustment cycle, which provides for dynamic adjustment of the cycle interval as well as of the maximum allowed queue depth, is shown in FIG. 11.

Figure 11:
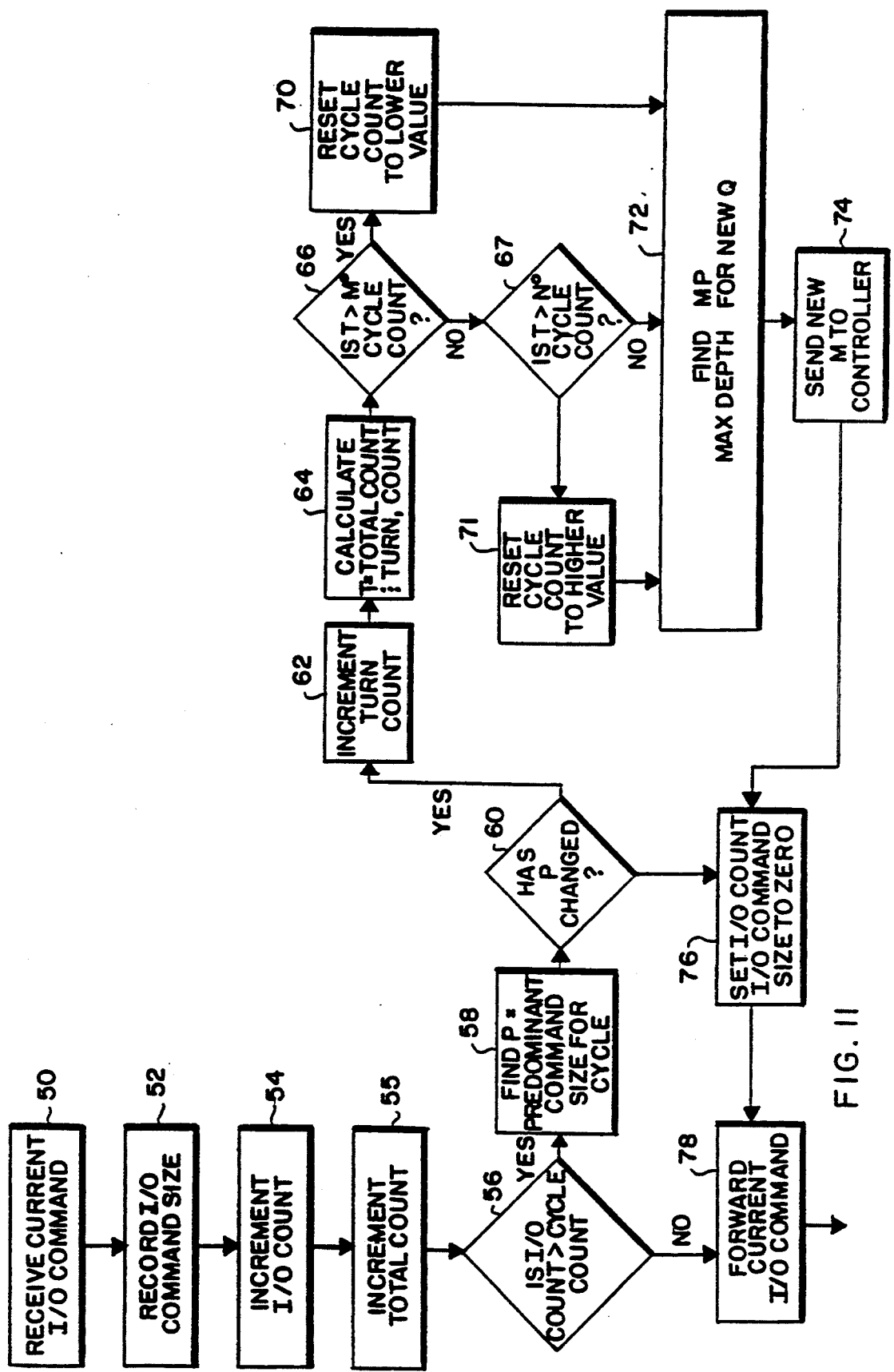
FIG. 11 is a flow chart showing the maximum queue depth adjustment process and thrashing adjustment process in accordance with an alternate embodiment of the current invention.

Turning now to FIG. 11, an I/O command is received by the queue depth adjustment software at step 50. This software may be resident on the host or on an intelligent controller. As indicated earlier, a typical I/O command is generated by an application program or operating system running on one of the host computers (4a or 4b in FIG. 1 or 14 in FIG. 2). At step 52, the software records the size of the I/O command. In the preferred embodiment, the I/O command sizes are stored in a histogram. The histogram intervals, or "buckets", preferably represent the range of I/O sizes possible for the system.

In order to monitor and control thrashing, it is desirable to be able to determine how frequently the maximum allowed queue depth is being reset in relation to the total number of I/O commands received by the system during a lifetime which is long in relation to a single cycle interval. Any suitably long period, such as the entire lifetime of the system, a system maintenance interval, or a period which is preestablished solely for this purpose, may be selected as the lifetime so long as the same lifetime is used for all lifetime variables. At step 54 the count of I/O commands received during the current cycle interval is incremented and at step 55 the total count of I/O commands received during the lifetime is incremented.

Just as in the embodiment discussed earlier, at step 56, the I/O count is tested to see if it exceeds the predetermined cycle count. If it does not, the current I/O command is forwarded at step 78, just as in the earlier embodiment. However, if the cycle count has been exceeded, then at step 58, P, the predominant I/O command size for the cycle, is determined. In the preferred embodiment, P is tested at step 60 to see if it has changed from the P selected during the previous cycle, before either the queue depth adjustment or the thrashing test is performed. While it is within the scope of the invention to do these at the end of every cycle, whether or not P has changed, it reduces system overhead to perform the adjustment and the test only for the cycles in which P has changed. If P has not changed, then, as before, at step 76, the adjustment software restarts the I/O count cycle by setting the I/O count and all histogram buckets to zero.

However, if the predominant command size, P, has changed, then at step 62, the software increments the turn count, a lifetime count of the number of times P has changed. At step 64, the thrash count, T, is calculated as the total command count for the lifetime divided by the turn count for the lifetime. In steps 66 and 67, the ratio of T to the length of the cycle interval is tested to determine whether it falls outside preestablished parameters. If T is too high, then the maximum allowed queue depth is rarely changing, which may indicate either that I/O loads are relatively constant or that the cycle count is so long that peaks and valleys in I/O load are being averaged out. In either case, shortening the cycle interval will not degrade performance, and additional optimizations may be possible if it is the latter case. Step 70 provides for a reset of the cycle count to a lower value. If T is too low, then the maximum allowed queue depth is changing so frequently that it may not reflect steady state loading conditions, and increasing the cycle interval may improve system performance. Step 71 provides for a reset of the cycle count to a higher value. In the preferred embodiment, ratios outside the range of about 10 to 20 would trigger resets of the cycle count. A reset in the range of 20–30% would be preferred. After any required reset has been performed, or immediately after testing if no reset is required, the maximum allowed queue depth M is calculated in step 72 in the same manner described earlier and this new M is sent to the controller at step 74. Then, as in the earlier embodiment, the cycle is zeroed at step 76 and the current I/O command is forwarded at step 78.

Figure 12:
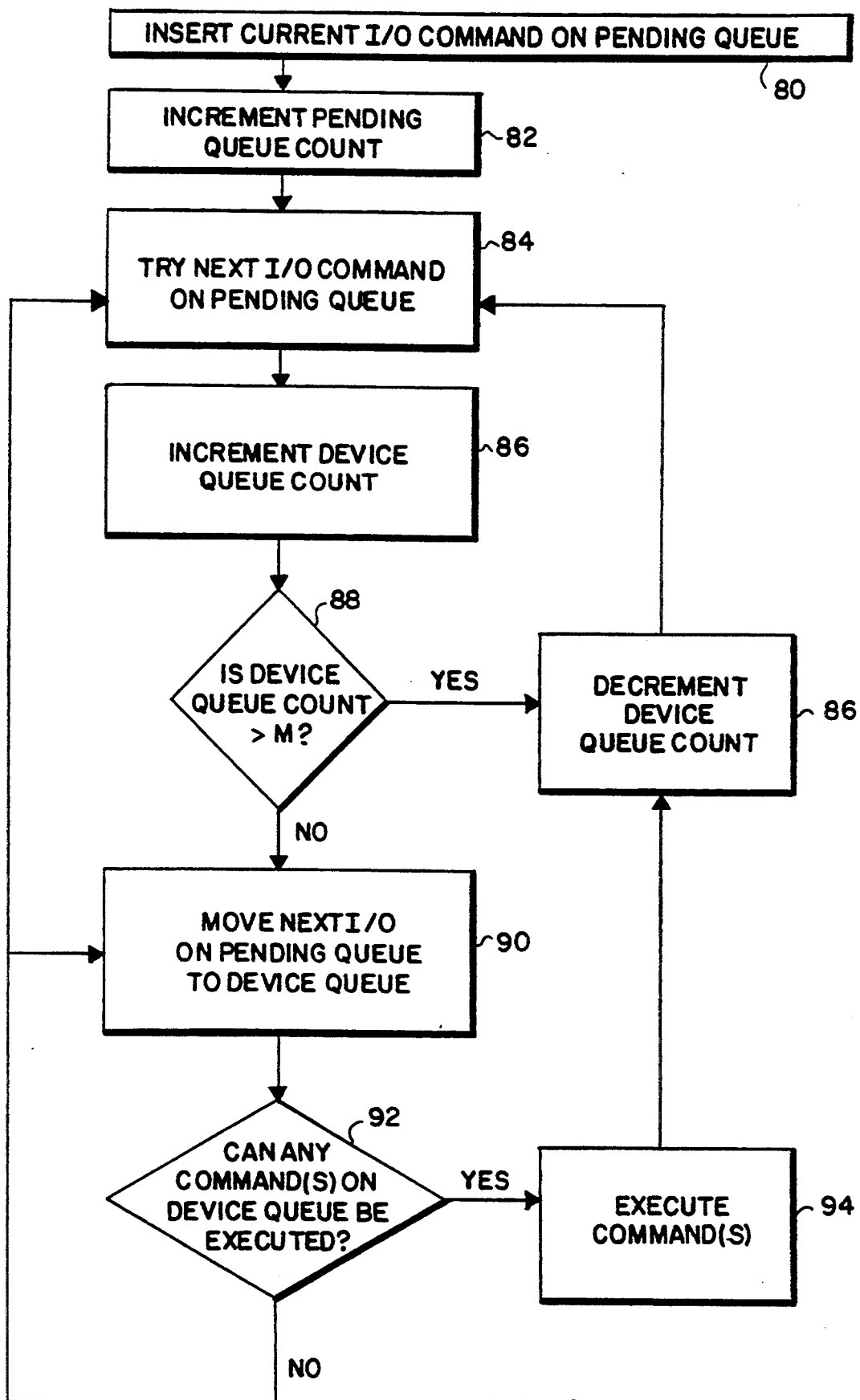
FIG. 12 is a flow chart showing the queue depth management process in accordance with a preferred embodiment of the present invention.

FIG. 12 is a flow chart showing the queue depth management cycle in accordance with a preferred embodiment of the present invention. In the preferred embodiment, the commands are passed sequentially through at least two queues, a pending queue with an essentially unlimited queue depth, and a device queue with an adjustable maximum allowed queue depth, M. At step 80, the controller inserts the current I/O command on the pending queue.

The controller may receive the command directly from the adjustment software at step 48, but in SCSI systems and many other complex I/O systems, intermediate procedures well known to those familiar with the design and operation of mass storage arrays may be performed for purposes such as command validation.

At step 82, the controller increments its pending queue count.

At step 84, the controller selects a next I/O command from its pending queue for possible transport to the device queue. It will be appreciated by those familiar with command queueing techniques, that the optimization algorithms employed in managing the queue will determine which of the commands in the queue is selected as the next command, and that the next command need not be either the first or last in the order received by the queue. The controller increments its device queue count at step 86, and at step 88, tests whether the new device queue count exceeds the current value of M, the maximum allowed device queue depth. If the allowed queue depth is exceeded, then the device queue count is decremented at step 86, the next command remains in the pending queue, and the controller returns to step 84 to try again. If the number of commands on the device queue is within the allowed value, then at step 90, it moves the next I/O command from the pending queue to the device queue. The controller, or in an alternative embodiment, the device itself, then tests at step 92 whether any command on the device queue may be executed.

If it can, that command is executed at step 94 and on completion of execution in accordance with the protocols for the particular I/O subsystem, the device queue count is decremented at step 96.

If no command in the device queue can be executed at that moment, the controller returns to step 88, to try to move a new next command to the device queue.

Those familiar with command queueing schemes will appreciate that while the queue management portion of the current invention resembles known protocols for managing fixed queues, except for the retries if step 92 indicates that no command on the device queue will currently execute or step 88 indicates that the device queue count exceeds the current value of M.

If the device queue depth were fixed as was done in the prior art, the queue management software could take no further action until a command on the device queue had been executed. Because, however, in the current invention M may vary periodically, movement of commands from the pending queue to the device queue does not have to be synchronous with execution of commands on the device queue, leading to greater efficiencies.

In the preferred embodiment of the invention, no movement of commands from the pending queue to the device queue is permitted while M is being reset. Because the time required to do the reset is extremely small, on the order of microseconds, this has no appreciable impact on overall system performance.

What has been described herein is a method and apparatus for improving the throughput in a command-queued mass storage subsystem by dynamically varying the maximum allowable queue depth for a command queue in relation to workload. It will be understood that various changes in the implementation details and the arrangements and configurations of the system which has been described and illustrated above in order to explain the nature of the present invention may be made by those of ordinary skill in the art without departing from the principle and scope of the present invention as expressed in the appended claims.

Appendix 1 .

```
#include <stdio.h>
#include <iodef.h>
#include <ssdef.h>
#include <math.h>
#include <dvidef.h>
include <unixlib.h> define MAX_QDEPTH 100          /* Max qdepth we can handle */
define MAX_BLKCNT 127          /* Max allowed xfer size in blocks */
#define QDEPTH_INCR 2           /* increment for qdepth test */
#define BLKCNT_INCR 4           /* increment for qdepth test */
define RUN_TIME 10             /* Run time in seconds */ define USE_SRAND               /* Define to use a more random sequence */
define BE_NOISY                /* say when queued != depth */ define VERSION "V1.1"          /* kind of a version number :-) */ define BYTE_COUNT 512
define BUFFER_SIZE (MAX_BLKCNT*BYTE_COUNT)+512 char    *buffer;
int     dkdesc[2];
short   dkchan;

int func,max_block,max_block_len;

int     IO_done_EF;

struct {
   int IOSB[2];
   int LBN;
   int start_time[2];
} IOlist[MAX_QDEPTH];
```

```c
unsigned int min_time = 0x7fffffff;
unsigned int max_time = 0;
unsigned int average_time;
unsigned int average_rem;
unsigned int total_time[2] = {0,0};
unsigned int max_qdepth = 0;
unsigned int IOcount,queued;
int max_queued=0,done;

int qdepth,depth,blkcnt,block_len;
int run_time;

FILE *ofp = (FILE *)NULL;

globalvalue     io$_readlblk;
globalvalue     io$_writelblk;
globalvalue     io$_nop;

void IO_AST(int);
void END(char *, int);

main (int argc, char **argv)
{
int status;
int iosb[2],mode,x;
int expire_delta_time[2],expire_time[2];
char *rt;

struct DVI_ITEM_LIST {          /* Define GETDVI item list */
        short length;                /* Length of output buffer */
        short code;                  /* GETDVI item code *
        int *max_block;              /* Address of output buffer */
        int *max_block_len;          /* Length of data returned */
        int terminator;              /* List terminator */
    } items;

if(argc < 5)
        END("usage: latency device qdepth block_count R/W [outfile]\n",1);

dkdesc[0] = strlen(argv[1]);
    dkdesc[1] = argv[1];
    qdepth = atoi(argv[2]);
    blkcnt = atoi(argv[3]);
    mode = toupper(argv[4][0]);
    if(argc == 6) {
        ofp = fopen(argv[5],"w");
        if(!ofp) END("bad outfile",1);
    } if(mode != 'R' && mode != 'W') END("Bad mode",1);
    if(qdepth > MAX_QDEPTH) END("bad qdepth",1);
    if(blkcnt > MAX_BLKCNT) END("bad block_count",1);

rt = getenv("RUN_TIME");
    if(rt)
        run_time = atoi(rt);
    else
        run_time = RUN_TIME;

func = (mode=='R'?io$_readlblk:io$_writelblk);

status = sys$assign (dkdesc, &dkchan, 0, 0);
    if (!(status & 1)) END("Error assigning channel",status);

if(!(buffer = malloc(BUFFER_SIZE))) END("Error allocating buffer",1);

status = lib$get_ef(&IO_done_EF);
    if (!(status & 1)) END("Error getting EFN",status);
    sys$clref(IO_done_EF);

items.code = DVI$_MAXBLOCK;
    items.length = 4;
    items.max_block = &max_block;
```

```
    items.max_block_len = &max_block_len;
    items.terminator = 0;

status = SYS$GETDVIW(IO_done_EF,dkchan,dkdesc,&items,
            iosb,0,0,0);
    if(!(status&1)) END("GETDVI for MAXBLK",status);
    if(!(iosb[0]&1)) END("GETDVI for MAXBLK",iosb[0]);

#ifdef USE_SRAND
    srand(time(0));
endif if(mode == 'W') {
        printf("\007WARNING: WRITE MODE - Trashing this disk!\n");
        printf("are you sure? (enter 42 to proceed) ");
        gets(buffer);
        if(atoi(buffer) != 42) END("Chicken!",1);
    }
    printf("Latency %s\n",VERSION);
    printf("qdepth 1-%d incr %d, blklen 1-%d incr %d of %s to %s for %d sec\n",
            qdepth,QDEPTH_INCR,blkcnt,BLKCNT_INCR,
            (mode=='R'?"io$_readlblk":"io$writelblk"),argv[1],run_time);
    printf("blklen\tqdepth\ttotal_io\tio/s\tkb/s\tmin\tmax\taverage\n");
    printf("------\t------\t--------\t----\t---\t---\t---\t-------\n");
    if(ofp) {
        fprintf(ofp,"# Latency %s\n",VERSION);
        fprintf(ofp,"#qdepth 1-%d incr %d, blklen 1-%d incr %d of %s to %s for %d sec\n",
                qdepth,QDEPTH_INCR,blkcnt,BLKCNT_INCR,
                (mode=='R'?"io$_readlblk":"io$writelblk"),argv[1],run_time);
        fprintf(ofp,"#blklen\tqdepth\ttotal_io\tio/s\tkb/s\tmin\tmax\taverage\n");
        fprintf(ofp,"#------\t------\t--------\t----\t---\t---\t---\t-------\n");
    } for(block_len = 1; block_len < blkcnt; block_len += BLKCNT_INCR) { for(depth = 1; depth < qdepth; depth += QDEPTH_INCR) { sys$clref(IO_done_EF);
            done=0;
            min_time = 0x7fffffff;
            max_time = 0;
            total_time[0] = 0;
            total_time[1] = 0;
            IOcount = 0;

expire_delta_time[0] = run_time*10*1000*1000;  /* 100 ns units */
            expire_delta_time[1] = 0;
            sys$gettim(expire_time);
            lib$addx(expire_delta_time,expire_time,expire_time,&2);
            status = sys$setimr(IO_done_EF,expire_time,0,0,0);
            if(!(status&1))
                END("expire timer error",status);

queued = 0;
            for(x=0; x < depth; x++) {
                IOlist[x].LBN = rand()%(max_block-block_len-1);
                sys$gettim(IOlist[x].start_time);
                status = sys$qio(0,dkchan,func,IOlist[x].IOSB,
                                IO_AST,x,buffer,BYTE_COUNT*block_len,
                                IOlist[x].LBN,0,0,0);
                if(!(status&1)) {
                    printf("at I/O post: %d\n",x);
                    END("QIO posting error",status);
                }
                IOcount++;
                queued++;
                if(done) break;
            }
#ifdef BE_NOISY
            if(queued != depth) {
                printf("queued (%d) != depth (%d)\n",queued,depth);
                if(ofp) fprintf(ofp,"# queued (%d) != depth (%d)\n",queued,depth);
```

```
#endif
            max_queued = queued > max_queued ? queued : max_queued;
            sys$waitfr(IO_done_EF);         /* Wait for timer */
            done=1;                         /* Flag AST completion routine */
            while(queued) sleep(1);                 /* Wait for all I/O to c
omplete */ lib$ediv(&IOcount,total_time,&average_time,&average_rem);
        printf("%d\t%d\t%d\t\t%d\t%d\t%d\t%d\t%d\n",
               block_len,depth,IOcount,
               IOcount/run_time,(IOcount*512*block_len)/run_time/1000,
               min_time/10000,max_time/10000,average_time/10000);
        if(ofp)
            fprintf(ofp,"%d\t%d\t%d\t\t%d\t%d\t%d\t%d\t%d\n",
                block_len,depth,IOcount,
                IOcount/run_time,(IOcount*512*block_len)/run_time/1000,
                min_time/10000,max_time/10000,average_time/10000);
    }
    printf("max_queued = %d\n",max_queued);
    printf("\n");
    if(ofp) {
        fprintf(ofp,"# max_queued = %d\n",max_queued);
        fprintf(ofp,"\n");        /* For gnuplot parametric data files */
    }
    }
    END("done",1);
} void IO_AST(int id)
{
int status;
int efstate;
int start_time[2],end_time[2],diff_time[2];

status = sys$gettim(end_time);
    start_time[0] = IOlist[id].start_time[0];
    start_time[1] = IOlist[id].start_time[1];
    queued--;

if(!(IOlist[id].IOSB[0]&1)) {
       printf("at IO_AST: %d\n",id);
       done = 1;
       END("QIO completion error",IOlist[id].IOSB[0]);
    } if(done) return;
    status = sys$readef(IO_done_EF,&efstate);
    if(status == SS$_WASSET) {
        done = 1;
        return;
    }

IOlist[id].LBN = rand()%(max_block-block_len-1);
    sys$gettim(IOlist[id].start_time);
    status = sys$qio(0,dkchan,func,IOlist[id].IOSB,
                     IO_AST,id,buffer,BYTE_COUNT*block_len,
                     IOlist[id].LBN,0,0,0);
    if(!(status&1)) {
       printf("at IO_AST requeue: %d\n",id);
       END("QIO posting error",status);
    }
    queued++;

max_qdepth = (max_qdepth < queued) ? queued : max_qdepth;

IOcount++;
    lib$subx(end_time,start_time,diff_time,&2);
    lib$addx(diff_time,total_time,total_time,&2);

/* ASSUME that no IO will ever take longer than 0xFFFFFFFF * 100 nanoseconds */
/* (About .429 seconds) */
```

```
        min_time = (diff_time[0] < min_time) ? diff_time[0] : min_time;
        max_time = (diff_time[0] > max_time) ? diff_time[0] : max_time;
} void END(char *text, int status)
{
            fprintf(ofp,"%d\t%d\t%d\t\t%d\t%d\t%d\t%d\t%d\n",
                    block_len,depth,IOcount,
                    IOcount,run_time,(IOcount*512*block_len)/run_time/1000.
                    min_time/10000,max_time/10000,average_time/10000);
        }
        printf("max_queued = %d\n",max_queued);
        printf("\n");
        if(ofp) {
            fprintf(ofp,"# max_queued = %d\n",max_queued);
            fprintf(ofp,"\n");    /* For gnuplot parametric data files */
        }
    }
    END("done",1);
} void IO_AST(int id)
{
int status;
int efstate;
int start_time[2],end_time[2],diff_time[2];

status = sys$gettim(end_time);
    start_time[0] = IOlist[id].start_time[0];
    start_time[1] = IOlist[id].start_time[1];
    queued--;

if(!(IOlist[id].IOSB[0]&1)) {
        printf("at IO_AST: %d\n",id);
        done = 1;
        END("QIO error",IOlist[id].IOSB[0]);
    } if(done) return;
    status = sys$readef(EF,&efstate);
    if(status == ...) {
        done = 1;
        return;
    }

IOlist[id].LBN = rand()%(max_block-block_len-1);
    sys$gettim(IOlist[id].start_time);
    status = sys$qio(0,dkchan,func,IOlist[id].IOSB,
                    IO_AST,id,buffer,BYTE_COUNT*block_len,
                    IOlist[id].LBN,0,0,0);
    if(!(status&1)) {
        printf("at IO_AST requeue: %d\n",id);
        END("QIO posting error",status);
    }
    queued++;

max_qdepth = (max_qdepth < queued) ? queued : max_qdepth;

IOcount++;
    lib$subx(end_time,start_time,diff_time,&2);
    lib$addx(diff_time,total_time,total_time,&2);

/* ASSUME that no IO will ever take longer than 0xFFFFFFFF * 100 nanoseconds */
/* (About .429 seconds) */ min_time = (diff_time[0] < min_time) ? diff_time[0] : min_time;
    max_time = (diff_time[0] > max_time) ? diff_time[0] : max_time;
} void END(char *text, int status)
{
```

What is claimed is:

1. A method for processing input/output (I/O) commands in a storage subsystem having a command queue, each I/O command having a size corresponding to a number of blocks of data to be subsequently retrieved and transmitted as a result of an execution of said each I/O command, comprising the steps of:

setting a maximum allowable depth for the command queue;

measuring the size of the I/O commands;

determining a predominant I/O command size; and dynamically varying the maximum allowable queue depth in inverse relation to the predominant I/O command size, said varying step including the steps of:

exercising the subsystem using a range of I/O command sizes and queue depths;

measuring a throughput actually obtained over the full range of expected queue depths and allowed I/O command sizes;

selecting a first approximate point where increasing queue depth no longer affects the throughput for the smallest allowed I/O command size as the maximum allowable queue depth for the smallest predominant I/O command size;

selecting a second approximate point where increasing queue depth no longer affects throughput for the largest allowed I/O command size as the maximum allowable queue depth for the largest predominant I/O command size;

fitting a curve for which queue depth is inversely proportional to the I/O command size between the first approximate point and the second approximate point;

storing in a table points on the curve; and selecting from the table a new maximum allowable queue depth corresponding to the current predominant command size.

2. A method as claimed in claim 1 further comprising the step of tuning the preselected maximum allowable queue depth values to minimize the average and maximum latencies of the subsystem.

3. A method for processing input/output (I/O) commands in a storage subsystem having a command queue, each I/O command having a size corresponding to a number of blocks of data to be subsequently retrieved and transmitted as a result of an execution of said each I/O command, comprising the steps of:

setting a maximum allowable depth for the command queue;

measuring the size of the I/O commands;

determining a predominant I/O command size; and dynamically varying the maximum allowable queue depth in inverse relation to the predominant I/O command size, said varying step including the steps of:

establishing a cycle interval for the determining of the predominant I/O command size, recording the size of each I/O command sent to the subsystem, periodically determining the predominant size for the I/O commands sent during the established cycle interval, and selecting from a table a new value for the maximum allowable queue depth on the basis of the current predominant I/O command size, wherein the values M(P) in the table are determined according to the equation $$\frac{y' * RZ}{PZ + KR} = M(P) \text{ where}$$

R is the maximum transfer rate between the subsystem and the host, K is the average access time for the storage device, and Z is the queuing efficiency factor for the subsystem.

4. A method as claimed in claim 3 further comprising the step of tuning the preselected maximum allowable queue depth values to minimize the average and maximum latencies of the subsystem.

5. A method for processing input/output (I/O) commands in a storage subsystem having a command queue, each I/O command having a size corresponding to a number of blocks of data to be subsequently retrieved and transmitted as a result of an execution of said each I/O command, comprising the steps of:

setting a maximum allowable depth for the command queue;

measuring the size of the I/O commands;

determining a predominant I/O command size; and dynamically varying the maximum allowable queue depth in inverse relation to the predominant I/O command size, said varying step including the steps of:

establishing a cycle interval for the determining of the predominant I/O command size, recording the size of each I/O command sent to the subsystem, periodically determining the predominant size for the I/O commands sent during the established cycle interval, and selecting from a table a new value for the maximum allowable queue depth on the basis of the current predominant I/O command size, wherein the values in said table are determined by solving for q the equation $$\min y = \frac{n*q}{R} + \frac{K*q}{Z} + C \text{ where}$$

y is the total subsystem response time, n is the allowed I/O command size, R is the maximum transfer rate between the subsystem and the host, K is the average access time for the storage device, C is a small system overhead factor and Z is the queuing efficiency factor for the subsystem.

* * * * *